United States Patent
Haas et al.

(10) Patent No.: US 7,202,088 B2
(45) Date of Patent: Apr. 10, 2007

(54) ARRANGEMENT FOR THE PARALLEL TESTING OF MATERIALS

(75) Inventors: Alfred Haas, Eppelheim (DE); Stephan Andreas Schunk, Heidelberg (DE); Dirk Demuth, Nussloch (DE); Wolfgang Strehlau, Dossenheim (DE); Armin Brenner, Spiesheim (DE); Wolfram Stichert, Heidelberg (DE)

(73) Assignee: hte Aktiengesellschaft the high throughput experimentation company, Heidelberg (DE)

( * ) Notice: Subject to any disclaimer, the term of this patent is extended or adjusted under 35 U.S.C. 154(b) by 575 days.

(21) Appl. No.: 10/333,850

(22) PCT Filed: Jul. 27, 2001

(86) PCT No.: PCT/EP01/08725

§ 371 (c)(1),
(2), (4) Date: Mar. 17, 2003

(87) PCT Pub. No.: WO02/09867

PCT Pub. Date: Feb. 7, 2002

(65) Prior Publication Data

US 2003/0159530 A1  Aug. 28, 2003

(30) Foreign Application Priority Data

Jul. 27, 2000  (DE)  .............................. 100 36 633

(51) Int. Cl.
  *G01N 31/10*  (2006.01)

(52) U.S. Cl. .................. 436/37; 422/138; 422/198; 422/130

(58) Field of Classification Search .................. 422/58, 422/138, 198, 200, 244, 130; 436/37
See application file for complete search history.

(56) References Cited

U.S. PATENT DOCUMENTS 5,690,763 A * 11/1997 Ashmead et al. ............. 156/60
6,409,072 B1 * 6/2002 Breuer et al. ............. 228/111.5

FOREIGN PATENT DOCUMENTS

| AU | 0 212 878 | * | 3/1987 |
| AU | 0 292 245 | * | 11/1988 |
| DE | 3525860 A1 | | 1/1987 |
| DE | 19754012 A1 | | 6/1999 |
| DE | 19917330 A1 | | 10/2000 |
| DE | 19917398 A1 | | 10/2000 |

OTHER PUBLICATIONS

Kessler, H.G. Lebensmittel-und Bioverfahrenstechnik, Verlag, A. Kessler. Freising, 1988, S. pp. 142-151.

* cited by examiner

*Primary Examiner*—Jill Warden
*Assistant Examiner*—Natalia Levkovich
(74) *Attorney, Agent, or Firm*—Jones Day

(57) ABSTRACT

The present invention relates to an arrangement, in particular for the parallel testing of a plurality of building blocks of a material library for performance characteristics, in which the arrangement has a block containing at least one reaction module and at least two heating/cooling modules.

17 Claims, 4 Drawing Sheets

Figure 1:
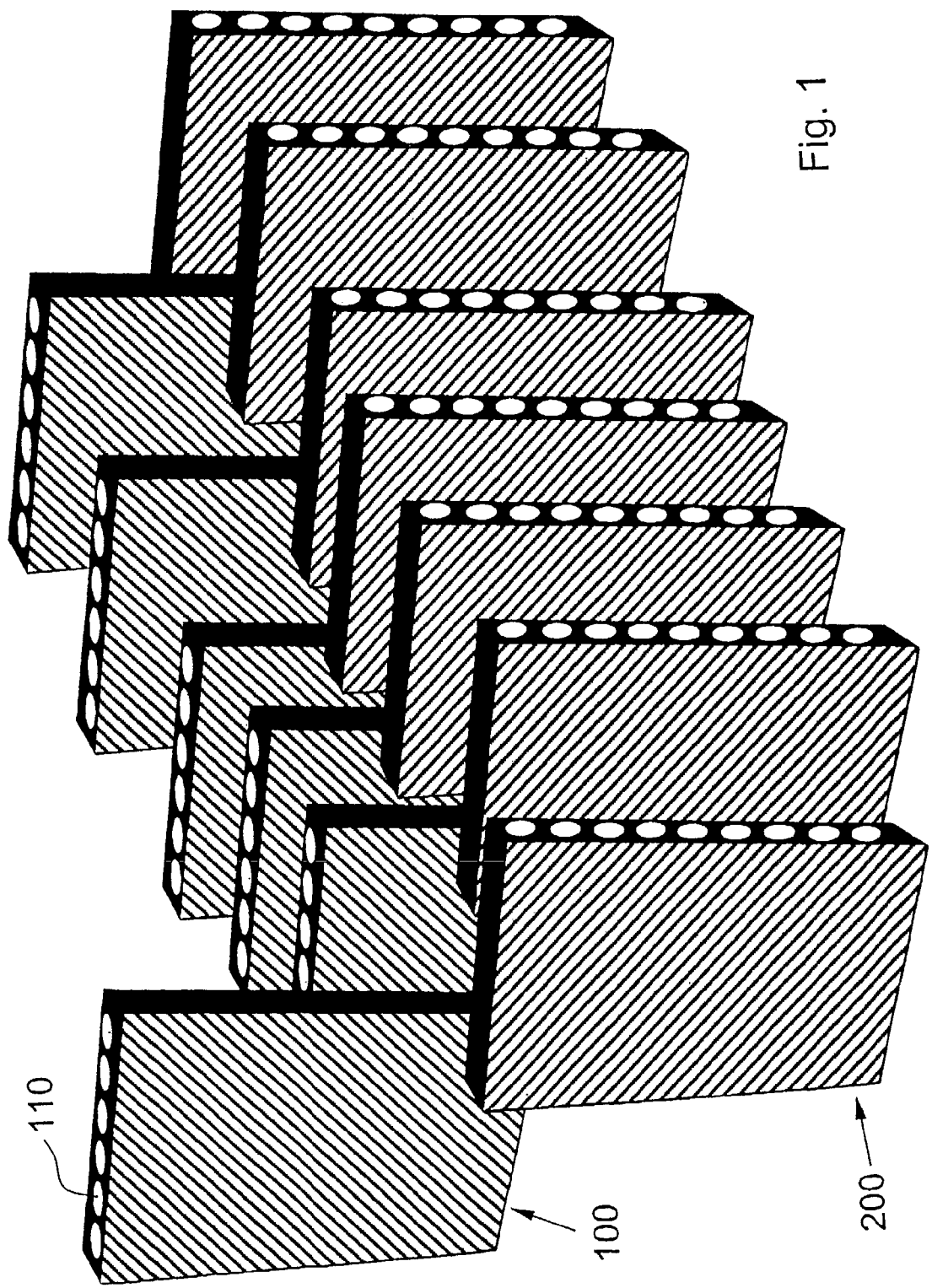

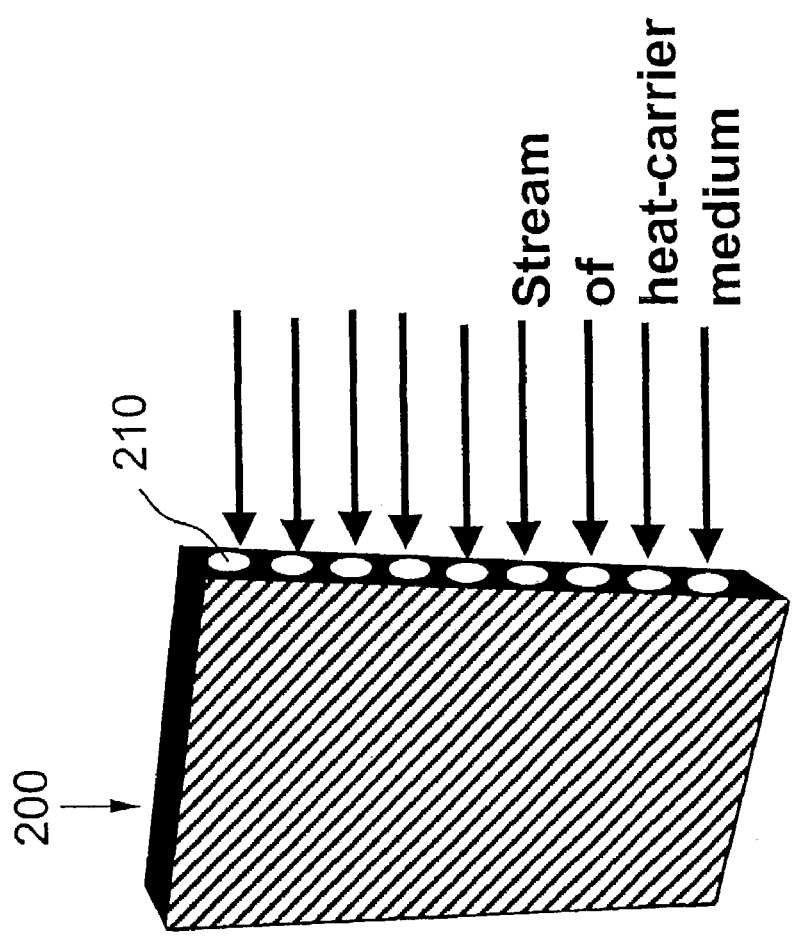
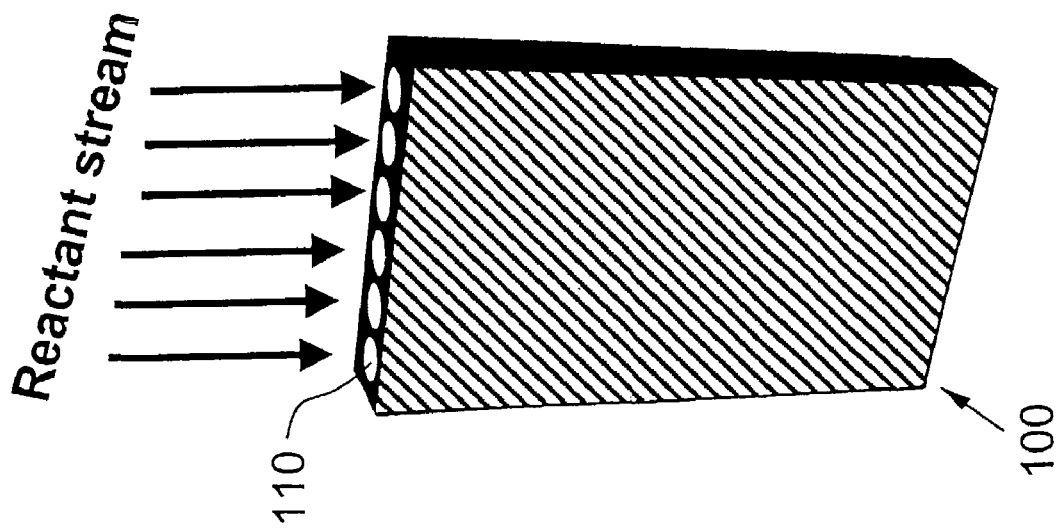
Fig. 2

ARRANGEMENT FOR THE PARALLEL TESTING OF MATERIALS

The present invention relates to an arrangement, preferably to a reactor, in particular to a tube-bundle-like reactor system, and to a method for testing materials for performance characteristics using this arrangement.

The inventive reactor can not only be used as a test reactor, but also for producing substances having performance characteristics (products of value) or for industrial applications, for example exhaust gas cleanup and chemical production.

For arrangements such as industrial reactors, for example, the optimum temperature profiling, in many applications, for example heterogeneously catalysed reactions, is of great importance for conversion rate, selectivity and space-time yield of a defined reaction.

The exact and optimum temperature profiling, particularly in the case of highly endothermic and also highly exothermic processes, plays a critical role for the abovementioned parameters characteristic of the reaction. In contrast, heating/cooling in the case of thermoneutral processes only takes place to maintain isothermal conditions, more precisely to maintain a certain reaction temperature or to establish a certain temperature course over time or space.

Such measures for temperature control are, inter alia, firstly direct heating or cooling by addition of reaction components (a) and secondly heat exchange by heat supply or removal by heat exchange surfaces, for example cooling or heating coils (b) and circulation of the entire reaction mixture, or a part thereof, through an external heat exchanger (c) separate from the reaction apparatus.

For a number of applications, however, it is not only of interest to strive for isothermal or adiabatic reaction conditions, but to impose a defined temperature profile on the reactor, which profile would not be established under customary adiabatic reaction conditions. This is the case, inter alia, in the testing of heterogeneous catalysts.

There are currently three variants of tube-bundle-reactor-like test reactors known for highly parallelized testing of heterogeneous catalysts under conditions relevant to processing, that is to say firstly ceramic monoliths with external heating, secondly ceramic modules with external heating, and thirdly metallic monoliths with internal or external heating.

Ceramic monoliths with external heating are disclosed, for example, in WO 97/32208. The different cells of a ceramic monolith are coated with potentially catalytically active substances and a gas mixture flows through them. In the monolith effluent, the gas stream is analysed for desired target products using a mobile capillary in the individual cells. The monolith is externally heated; for this purpose it is, for example, introduced into a heated metal jacket or is operated in a conventional furnace.

The second variant made of ceramic modules with external heating is disclosed, for example, in WO 99/19724. With this reactor type, the above-described ceramic monolith is replaced by ceramic modules having a multiplicity of channels. These ceramic modules can be disassembled in the middle along the channel direction, which makes possible simplified filling of the individual channels with catalyst.

A metallic monolith with internal or external heating according to the third variant is disclosed in DE-A 198 09 477. According to this a reaction gas mixture flows through a metallic monolith or tubular reactor in which the individual tubes within the monolith are charged with potential active compositions. A cross-diffusion of reactants into another channel is excluded by using metal as a reaction vessel.

The product gas mixtures can be analysed at the different tubes either using a mobile capillary or by an adjustable valve system. Advantages over the ceramic monolith are the simply controllable flows through the individual reactor tubes and the uniform and readily controllable heating of the reactor. Therefore, preheating of the reaction gases can be omitted without running the risk of having different temperatures in the various tubes.

The metallic monolith offers the great advantage over the ceramic monolith that in this case, in addition to coated ceramics which can be simply introduced into the tubes, powders can also be tested as active compositions.

A further fixed-bed reactor for the parallel testing of members of a material library is described in WO 99/64160. This reactor has a multiplicity of collection devices for the members to be analysed and is characterized in particular in that it has a plurality of flow-restriction devices for controlling the flow within the reactor.

None of the reactor variants described in the prior art solves the problem of imposing a defined temperature profile.

The object therefore underlying the present invention is to provide an improved arrangement which is suitable, inter alia, for carrying out the testing of building blocks of a material library with imposition of any predetermined, preferably precisely defined, temperature profile and maintaining the temperature profile during the testing.

These and other objects are achieved according to the invention by an arrangement, in particular for the parallel testing of a plurality of building blocks of a material library for performance characteristics, in which the arrangement has a block containing at least one reaction module and at least two heating/cooling modules. Other aspects and advantages are given by the dependent claims, the description hereinafter and the drawings. The term "material library" designates a collection of at least two, preferably up to ten, further preferably up to one hundred, in particular up to one thousand, and further preferably up to one hundred thousand, building blocks, which, within the block used according to the invention, are situated in at least two different sections separated from one another within the block.

The term used herein "building block of a material library" comprises non-gaseous substances, for example solids, liquids, sols, gels, waxy substances or substance mixtures, dispersions, emulsions, suspensions and solids, particularly preferably solids. The building blocks can be molecular and non-molecular chemical compounds or formulations, or mixtures, or materials, in which the term "non-molecular" defines building blocks which can be continuously optimized or altered, in contrast to "molecular" building blocks, whose structural properties can only be altered via a variation of discrete states, that is to say for example varying a substitution pattern. The building blocks are situated in sections of the reaction module which are each separated from one another and can consist of one or more chemical components.

The building blocks to be tested in the individual reaction channels can be identical to one another or different from one another, the latter being preferred. In the case of an optimization of test parameters or reaction parameters or production parameters or method parameters for a defined test, a defined reaction or a defined production, it is, however, also readily possible that a plurality of identical or solely identical substances are tested for their performance characteristics during a test.

Preferably, as building blocks to be tested, the following classes of substances/materials are tested: heterogeneous or heterogenized catalysts, luminophores, electro-optical, superconducting or magnetic substances, or mixtures of two or more thereof; in particular intermetallic compounds, oxides, oxide mixtures, mixed oxides, ionic or covalent compounds of metals and/or non-metals, metal alloys, ceramics, organometallic compounds and composite materials, dielectrics, thermoelectrics, magnetoresistive and magnetooptic materials, organic compounds, enzymes, active pharmaceutical compounds, substances for foodstuffs and food supplements, feedstuffs and feed supplements and cosmetics and mixtures of two or more oxides.

The term "performance characteristics" is taken to mean characteristics of the building blocks which can be measured using the inventive arrangement. This term comprises, depending on the type of test, inter alia catalytic, electrical, thermal, mechanical, morphological, optical and magnetic properties of the tested substances, with two or more performance characteristics also being able to be tested.

Preferably, the arrangement is a reactor, further preferably a tube-bundle-like reactor system. The inventive arrangement permits the simultaneous or sequential testing of a plurality of substances for their performance characteristics, in which the test parameters, that is to say the one or more variables which establish the type and conditions of testing, for example pressure, temperature, etc., can be freely chosen.

The arrangement comprises a block. Its outer shape is not subject to any restrictions and can have the shape of a cuboid, a cube, a cylinder or a prism. The block has a subdivision into heating/cooling and reaction module(s). These heating/cooling and reaction modules are preferably not permanently connected to one another, but rather can be individually freely exchanged, removed and recombined. Preferably, the reaction modules and the heating/cooling modules are disc-shaped. The sum of the number of heating/cooling and reaction modules is not upwardly restricted and is typically 3 to 300, where the number of heating/cooling modules is always at least one higher than the number of the reaction modules.

Typically, each reaction module is followed by a heating/cooling module, this being laterally bordered by at least two heating/cooling modules preferably when one reaction module is present. However, it is also possible to provide next to the reaction modules in each case at least one cooling module and at least one heating module as heating/cooling module, the sequence being able to be freely selected in each case.

With respect to the material of the modules used according to the invention or of the block, there are no special restrictions, provided that the materials used withstand the test conditions or are inert towards the substances to be tested. Preference is given to ceramics, metals or metal alloys, for example brass, aluminium, stainless steels, for example those having the DIN material numbers 1.4401, 1.4435, 1.4541, 1.4571, 1.4573, 1.4575, 2.4360/2.4366, 2.4615/2.4617, 2.4800/2.4810, 2,4816, 2.4851, 2.4856, 2.4858, 1.4767, 1.4401, 2.4610, 1.4765, 1.4847, 1.4301.

Within the block used according to the invention, temperature profiles can be imposed by the heating/cooling modules along the reaction path, which temperature profiles can otherwise only be realized in serially connected reactors.

In addition to the actual test device, the above-defined block, the inventive arrangement can have devices for feeding the substances, devices for feeding and removing starting materials, for example gases, which serve for testing the performance characteristics, and devices for the analysis of products which are obtained after the reaction with the building blocks to be tested, for example heterogeneous catalysts, and/or devices for the analysis of the building blocks themselves after passing through the testing. In addition, the inventive arrangement can also comprise devices for data analysis and automated control of the testing. Preferably, the arrangement has a guide element or one or more base plates in which the block or the modules are disposed.

By means of the modular construction, the complete block can be simply demounted. This modular construction type considerably facilitates, inter alia, sample change, for example during testing of catalysts, and the associated mechanical work.

The inventive arrangement can be used, inter alia, as a tube-bundle-like test reactor for the highly parallel testing of heterogeneous catalysts under conditions relevant to processing. Conditions relevant to processing, here, inter alia, pressure and/or temperature ranges and gas volumes and gas mixtures, allow conclusions to be drawn regarding the performance of the catalyst under the intended service conditions.

Figure 3:
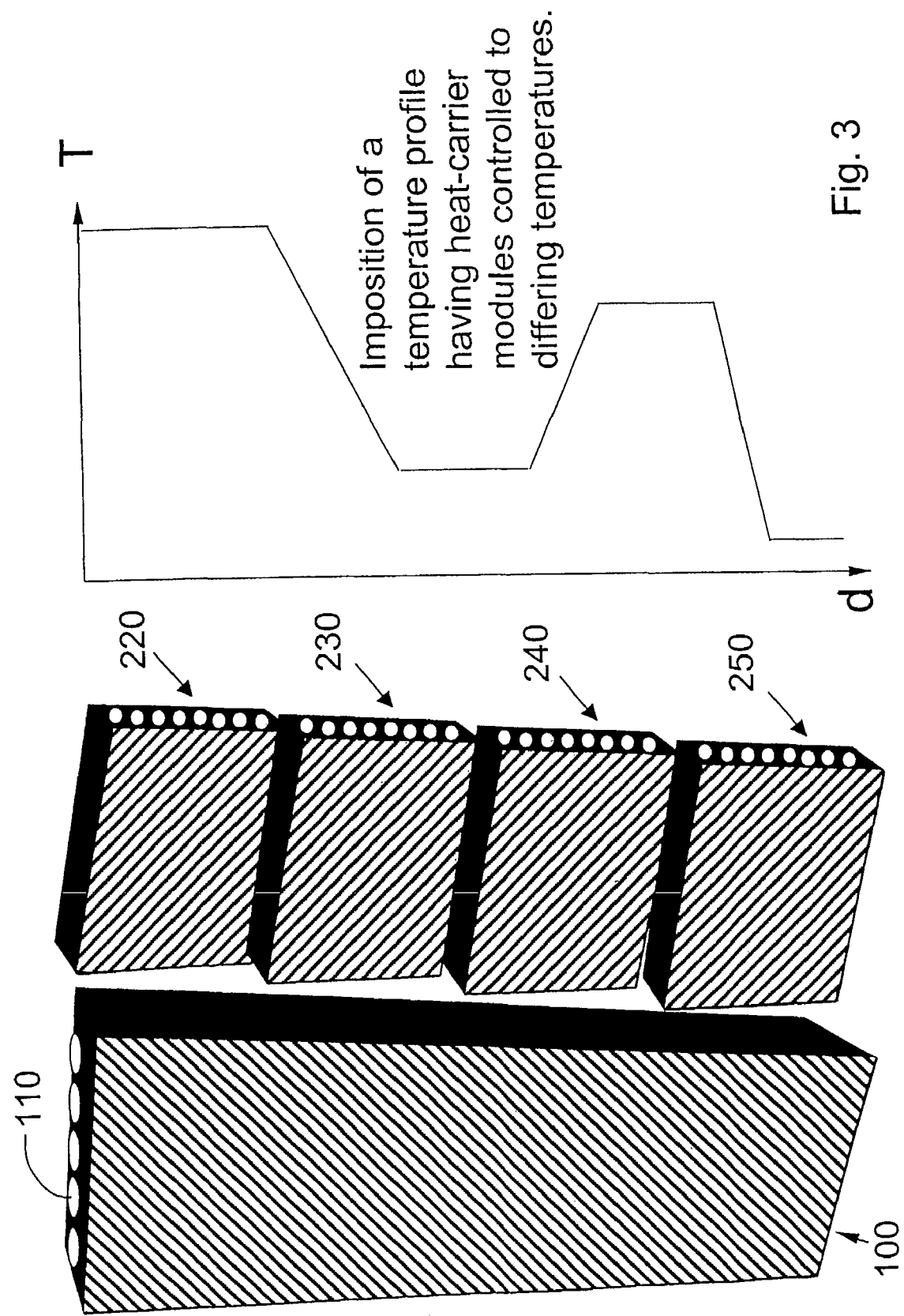

The invention will now be described by means of the accompanying drawings with reference to the use of the inventive arrangement for testing of heterogeneous catalysts. In the testing of building blocks having other performance characteristics, the abovementioned is usable analogously or it will, if it appears necessary, be described separately. For better explanation, reference is made in part to the accompanying figures in which:

FIG. 1: shows the modules of an example of the invention;

FIG. 2: shows the course of the reactant stream and of the heat carrier stream through the reaction modules or through the heating/cooling modules according to the first example of the invention; and FIG. 3: shows a reaction module and a heating/cooling module according to a second example of the invention.

Figure 4:
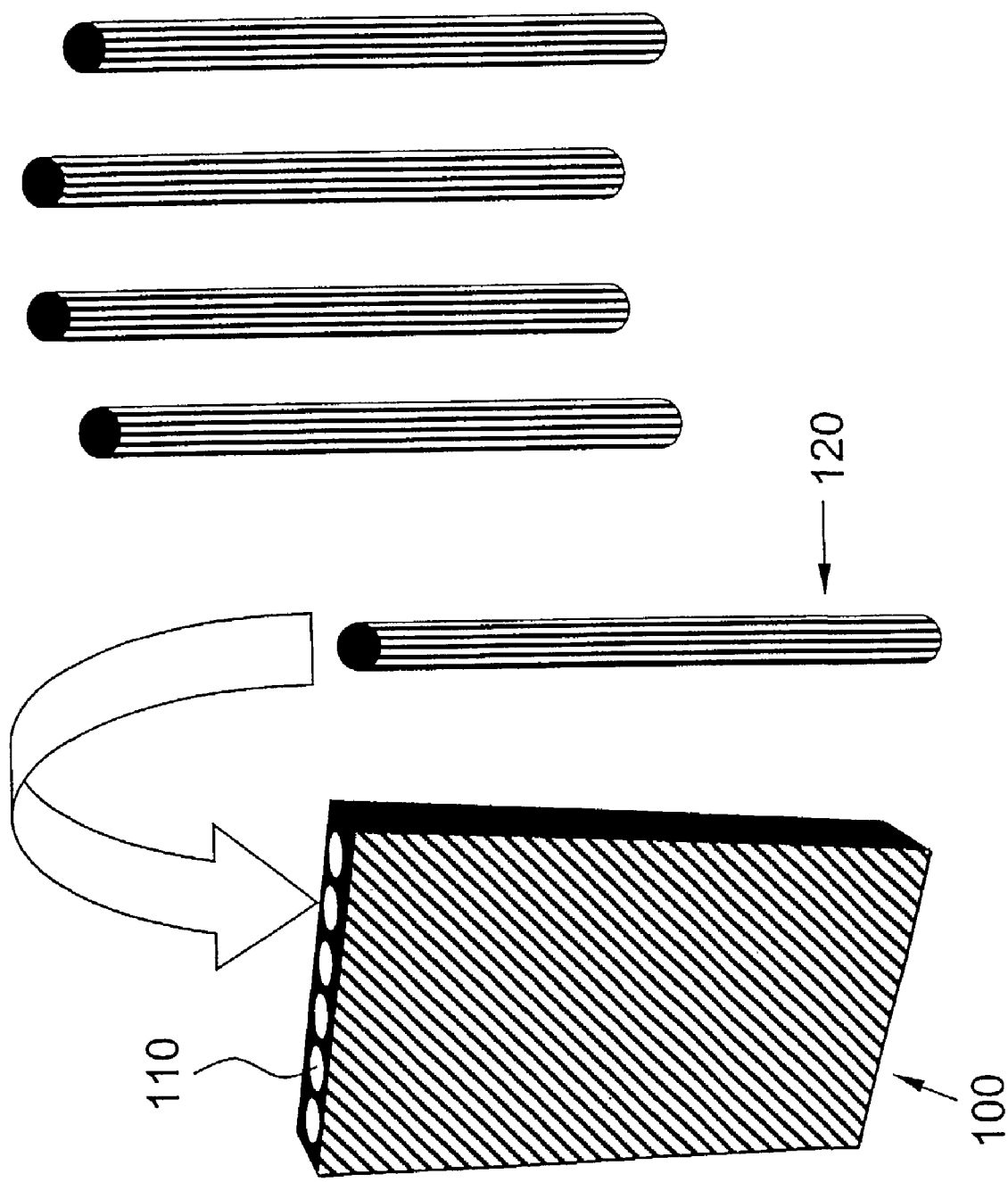

FIG. 4: shows a reaction module having special internal tubes for simplified sample change.

As can be seen in FIG. 1, the arrangement preferably comprises alternating units of reaction modules 100 and heating/cooling modules 200; these sit further preferably on a guide element (which is not shown). Preferably a heating/cooling module 200 always follows a reaction module 100 and the entire system is preferably framed by two heating/cooling modules 200, in order to ensure homogeneous temperature control even among the outer reaction modules (temperature differences <1° C., preferably 0.5° C., further preferably 0.3° C.).

The reaction modules 100 each preferably have a multiplicity, that is to say 2 or more, preferably 5 to 100, and in particular 8 to 12, reaction channels 110, in each case depending on the dimensions of the reaction module, which are further preferably arranged in rows next to one another.

The reaction channels are preferably tubular, further preferably continuous and in particular tubular and continuous in the at least one reaction module. Optionally, the channels can also be closed automatically or manually at one end or both ends.

The reaction channels 110 can be filled either automatically or manually with the building blocks to be tested, in which case, depending on the building block to be tested, collection devices or devices for fixing the building blocks into the reaction channels can also be introduced or are already situated therein. In addition, it is also possible to coat the walls of the reaction channels with the substances, for example a catalytically active substance.

Preferably, the reaction channels are filled with any shaped bodies or powders. In a further preferred embodiment, special internal tubes, for example having catalyst chairs, can be inserted into the reaction channels 110, which internal tubes facilitate transfer of the catalyst samples into the reactor space.

Such an embodiment having an internal tube is shown diagrammatically in FIG. 4.

As is shown by FIG. 4, the internal tubes 120, which can be constructed as described above, are introduced into the reaction channels 110 of the reaction module 100 and can then, for example, be filled with a catalyst sample.

The reaction modules 100 can be connected via a piping system, or capillaries, to a starting material reservoir, for example a fluid reservoir.

Preferably, the individual reaction channels of the reaction module are separately controllable with respect to the starting materials and gases flowing through them.

Preferably, mass flow regulators are provided in the individual capillaries which ensure that the flow through each reaction channel 110 in the reaction module 100 can be individually controlled.

In addition, the inventive arrangement can have devices for flow control. For example, a passive, restrictive flow control of all reaction channels is possible by flow restrictors, for example metal plates having bore holes and/or frits, being provided spatially upstream of the reaction channels, which flow restrictors control the flow of the influent gas and ensure a substantial equal distribution of the influent gases over the individual reaction channels.

In addition it is possible to provide such a device for passive restrictive flow control downstream of the reaction channels of the reaction module, in which case such a device has the same action as the above-described flow control upstream of the reaction channels.

Devices for passive flow control which may be mentioned are: sintered metal plates, sintered ceramic frits, drilled metal plates, suitable capillaries in suitable thread fittings.

An individual, active, restrictive flow control which preferably runs automatically, is possible by providing a control valve, for example a needle valve, upstream of the analysis unit. By this means the flow is controlled in each individually analysed reaction channel.

The at least one reaction module 100 preferably further comprises analysis channels for sample removal, in which case, further preferably, at least one analysis channel is assigned to each reaction channel 110 in the at least one reaction module.

The analysis channel or the analysis channels here represent a connection between the reaction channel and the analysis unit. Typically, via the analysis channels, the effluent stream of at least one reaction channel, preferably the effluent streams of all reaction channels, are fed to an analysis unit. Typically, the analysis devices in turn have selection devices which enable the individual effluent streams each to be analysed individually by a suitable analysis method. The effluent streams which are not analysed are collected in this case in a suitable collection device and discarded. Suitable selection devices are all conventional devices used therefor, for example multiport valves.

The effluent stream from testing can also be individually borne by capillaries. In a particular embodiment, the analysis of the effluent stream can be performed by means of a mobile capillary, the effluent stream or parts thereof being pumped out, preferably via the capillary, by means of a suitable pumping device.

Particularly preferably, computer-controlled, mechanically movable "sniffing apparatuses", as described in detail in WO 99/41005, are used.

Instead of the analysis described above by way of example of effluent streams for testing catalytic characteristics as performance characteristic of building blocks, obviously other performance characteristics of the building blocks, for example structural change or morphology change or effects of external test parameters, for example pressure and temperature, on the building blocks to be tested can also be studied. In this case the building blocks may be removed from the reaction module and tested externally. However, preferably, the building blocks, in particular in order to exclude further external influences, are left in the reaction module and analysed there "in situ". This can be carried out, for example, by optical detection methods, which can preferably be carried out spatially removed, via, for example, glass fibre optics.

As mentioned at the outset, the inventive arrangement can be used not only as test reactor, but also for the production of substances having performance characteristics, or for industrial applications, for example exhaust gas cleanup and chemical production and can then obviously be designed appropriately.

With respect to the analysis methods for determining the performance characteristics of the tested substances, there exist in principle no restrictions. During the analysis of the catalytic properties of substances which are potentially homogeneous or heterogeneous catalysts, preferred analysis methods comprise in particular infrared thermography, preferably in combination with mass spectroscopy, GC, LC, HPLC, micro GC, dispersive FT-IR spectroscopy, Raman spectroscopy, NIR, UV, UV-VIS, NMR, GC-MS, infrared thermography/Raman spectroscopy, infrared thermography/dispersive FT-IR spectroscopy, colour detection using a chemical indicator/MS, colour detection using a chemical indicator/GC-MS, colour detection using a chemical indicator/dispersive FT-IR spectroscopy, and photo acoustic analysis.

The heating/cooling modules 200, preferably in disc form, each have at least one heating element and/or at least one cooling element. These can preferably be controlled in a closed-loop or open-loop manner, each independently of one another, or can be set with respect to temperature (see FIG. 3; heating elements and cooling elements (220, 230, 240, 250)). Preferably, the individual heating modules are able to generate a predetermined temperature profile along the reaction channels 110 in at least one, preferably in an adjoining, reaction module (110). Further preferably, the heating elements and/or cooling elements (220, 230, 240, 250) are disposed in such a manner that the predefined temperature profile can be generated identically for all reaction channels 110 in a reaction module 100.

In one embodiment, the heating/cooling modules comprise electrical heating elements, for example welded-in heating wires. Alternatively, or additionally thereto, the heating/cooling modules can have 200 channels which are charged with heat-carrier media such as gases, liquids, solutions or melts.

The heating/cooling modules preferably have for this purpose channels for a heat-carrier medium, in which case the channels, according to a further aspect of the invention, preferably run perpendicularly to the direction of the reaction channels (see FIG. 1).

The temperature control can, according to another aspect of the invention, also be matched individually to the individual tubes or tube modules.

In the embodiment pictured, the contact surfaces between the reaction modules 100 and the heating/cooling modules 200 are planar, with the contact surfaces, to increase the contact surface area, also being able to have relief structures which are complementary to one another, for example waves or prisms. However, in this case, more stringent requirements must be made of the compatibility of the thermal expansion coefficients. The heating/cooling modules 200 preferably each have a plurality of channels 210 for a heat-carrier medium. The channels (210) for a heat-carrier medium are preferably disposed in the heating/cooling modules in such a manner that they run in the block perpendicularly to the longitudinal direction of the reaction channels. This is shown in FIG. 1.

In the embodiment shown there, the channels 210 are continuous, where in operation they are coupled via connections (which are not shown) to a piping system. The flow of the heat-carrier medium in relation to the reactant stream is shown diagrammatically in FIG. 2.

In another embodiment, the channels run in a serpentine manner through the heating/cooling modules, so that, per heating/cooling module, only one inlet and one outlet is required in each case.

Whereas, in the example according to FIG. 1, one heating/cooling module 200 in each case extends over the entire length of the reaction channels 10, the heating/cooling modules of the example according to FIG. 3 are divided into submodules 220, 230, 240, 250, which make it simpler to impose a temperature profile. In this case the individual submodules each extend over only one longitudinal section of the reaction channels, the channels for the heat-carrying medium in turn running perpendicularly to the reaction channels 110. The submodules 220, 230, 240, 250 can have continuous or serpentine-like channels, as do the heating/cooling modules 200.

A temperature profile can have any arrangements of warmer and colder zones along a reaction channel. Both the number of the temperature zones and the sought-after temperature in the respective temperature zones is virtually unlimited. Whereas in the current state of the art, preheating/post-heating or preheating/post-cooling is performed in a separate reaction vessel, in the design described here, this can take place in a tube-bundle-like reactor. Thus it is possible in a tube-bundle-like reactor to carry out reactions under different conditions (temperatures). Compact reactors of this type are of interest as components for research purposes or, as small, compact systems, which are useful in the event of great space restrictions, as prevail, for example, on ships or drilling platforms.

In addition, the at least one reaction module 100 and/or the heating/cooling modules 200 can each have at least one temperature sensor, in particular one thermocouple for temperature control. The at least one temperature sensor is preferably disposed in the at least one reaction module adjacently to at least one reaction channel.

As results from the above, the present invention also relates to a method for the parallel or sequential testing of building blocks for performance characteristics, the materials being tested in an inventive arrangement, that is to say are subjected to defined tests.

In the context of the inventive method, in particular the following reactions may be studied or catalytically active substances for such reactions tested:

Examples of suitable reactions are the decomposition of nitrogen oxides, ammonia synthesis, ammonia oxidation, oxidation of hydrogen sulphide to sulphur, oxidation of sulphur dioxide, direct synthesis of methyl chlorosilanes, oil refining, oxidative coupling of methane, methanol synthesis, hydrogenation of carbon monoxide and carbon dioxide, conversion of methanol into hydrocarbons, catalytic reforming, catalytic cracking and hydrocracking, carbon gasification and carbon liquefaction, fuel cells, heterogeneous photocatalysis, synthesis of ethers, in particular MTBE and TAME, isomerizations, alkylations, aromatizations, dehydrogenations, hydrogenations, hydroformylations, selective or partial oxidations, aminations, halogenations, nucleophilic aromatic substitutions, addition and elimination reactions, dimerizations, oligomerizations and metathesis, polymerizations, enantioselective catalysis and biocatalytic reactions and for material testing, and in particular for determining interactions between two or more components at surfaces or substrates, in particular in the case of composite materials.

The inventive arrangement, owing to its modular construction of reaction elements and heating/cooling elements, represents a substantial improvement in comparison with the prior art.

Owing to the modular construction, good accessibility of all parts is ensured. The good accessibility is facilitated, according to a particularly preferred embodiment of the invention, by mounting the block in a frame or rack.

This is of great importance precisely when the catalyst is changed, since time-saving automated opening and closing of the connections can only be ensured for good accessibility of the individual connections.

Mounting in the guide elements/base plates simultaneously ensures a high density of measuring, control and reaction elements in a very small space, which offers great advantages in the case of reactors having a great number of reaction channels, since in this manner long gas paths through the capillaries of the inlets and outlets are avoided. As a result the dead volumes are decreased and the analysis times can be considerably shortened.

A further great advantage is the use of the modular heating elements. Within these heating elements, in the case of the use of heat-carrier media, cooling sections can also very easily be incorporated. Thus, along a reactor tube, a temperature profile having hot and colder sections can simply be imposed. Such a cooling section can be of great interest precisely for avoiding and suppressing hot-spot formation. Temperature control with deviations <0.1° C. is possible by means of such combined cooling sections and heating sections.

The modular structure ensures a great ease of maintenance, the reactor is simple to clean, the catalysts can be rapidly and easily changed. The arrangement can be operated in a precise manner, for example as a reactor over a large temperature range, and can be used for two or three phase reactions with heterogeneous or homogeneous catalysts.

Even in the event of blockages of individual tubes, these can be replaced without problem as a disc element. In a disc, virtually any number of reaction channels can be accommodated. Further work which is also necessary on the modular heating elements is also made considerably easier.

The invention claim is:

1. A chemical reactor apparatus comprising:
   temperature control blocks; and
   a reaction block removably interleaved between the control blocks and having a reaction channel configured to conduct a reactant as the reactant undergoes a reaction at a temperature controlled by the adjacent control blocks;
   each control block including control channels that are spaced apart along the length of the reaction channel and configured for a temperature of a fluid conducted through each control channel to be controlled independently of the other control channels in the respective control block to provide the reaction channel with a predetermined temperature profile.

2. The apparatus of claim 1 wherein the control channels are perpendicular to the reaction channel.

3. The apparatus of claim 1 wherein the reaction channel is one of multiple parallel reaction channels in the reaction block, each configured to conduct a reactant as the reactant undergoes a reaction while exposed to the same predetermined temperature profile, controlled by the adjacent control blocks, as the other reactions in the reaction block.

4. The apparatus of claim 1 further comprising multiple reaction blocks, including said reaction block, removably interleaved between the control blocks, each reaction block having a reaction channel configured to conduct a reactant as the reactant undergoes a reaction at a temperature controlled by the adjacent control blocks.

5. The apparatus of claim 4 wherein the control channels are perpendicular to the reaction channels.

6. A method for use with the apparatus of claim 1, comprising heating the fluid flowing through at least one of the control channels of one of the control blocks and cooling the fluid flowing through at least one of the other control channels of the same control block.

7. A chemical reactor apparatus comprising:
   temperature control blocks; and
   a reaction block removably interleaved between the control blocks and having a reaction channel configured to conduct a reactant as the reactant undergoes a reaction at a temperature controlled by the adjacent control blocks;
   each control block including electric heating lines that are spaced apart along the length of the reaction channel and configured to be controlled independently of the other control channels in the respective control block to provide the reaction channel with a predetermined temperature profile.

8. The apparatus of claim 7 wherein the heating lines are perpendicular to the reaction channel.

9. The apparatus of claim 7 wherein the reaction channel is one of multiple parallel reaction channels in the reaction block, each configured to conduct a reactant as the reactant undergoes a reaction while exposed to the same predetermined temperature profile, controlled by the adjacent control blocks, as the other reactions in the reaction block.

10. The apparatus of claim 7 further comprising multiple reaction blocks, including said reaction block, removably interleaved between the control blocks, each reaction block having a reaction channel configured to conduct a reactant as the reactant undergoes a reaction at a temperature controlled by the adjacent control blocks.

11. The apparatus of claim 10 wherein the control channels are perpendicular to the reaction channels.

12. The apparatus of claim 1 wherein the reaction channel is one of multiple parallel reaction channels in the reaction block, and further comprising an analyzing device configured to measure a characteristic of the reaction for each reaction channel individually.

13. The apparatus of claim 1 wherein the reaction channel is one of multiple parallel reaction channels in the reaction block, and the reaction channels contain catalysts, for catalyzing the reactions, differing from one reaction block to the next.

14. The apparatus of claim 1 wherein the reaction channel includes a tube removably inserted trough a bore in the reaction block.

15. The apparatus of claim 7 wherein the reaction channel is one of multiple parallel reaction channels in the reaction block, and further comprising an analyzing device configured to measure a characteristic of the reaction for each reaction channel individually.

16. The apparatus of claim 7 wherein the reaction channel is one of multiple parallel reaction channels in the reaction block, and the reaction channels contain catalysts, for catalyzing the reactions, differing from one reaction block to the next.

17. The apparatus of claim 7 wherein the reaction channel includes a tube removably inserted through a bore in the reaction block.

* * * * *